United States Patent
Perotti (10) Patent No.: US 10,812,213 B2
(45) Date of Patent: Oct. 20, 2020

(54) MULTIUSER SUPERPOSED TRANSMISSION WITH FLEXIBLE TRANSPORT BLOCK SIZE SELECTION

(71) Applicant: Huawei Technologies Co., Ltd., Shenzhen (CN)

(72) Inventor: Alberto Giuseppe Perotti, Segrate (IT)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/374,268

(22) Filed: Apr. 3, 2019

(65) Prior Publication Data

US 2019/0229836 A1    Jul. 25, 2019

Related U.S. Application Data

(63) Continuation of application No. PCT/EP2016/073674, filed on Oct. 4, 2016.

(51) Int. Cl.
| | |
|---|---|
| H04L 1/00 | (2006.01) |
| H04L 27/34 | (2006.01) |
| H04L 1/20 | (2006.01) |
| H04L 5/00 | (2006.01) |

(52) U.S. Cl.
CPC .......... H04L 1/0005 (2013.01); H04L 1/0006 (2013.01); H04L 1/0009 (2013.01);
(Continued)

(58) Field of Classification Search
CPC ... H04L 1/0005; H04L 1/0006; H04L 1/0009; H04L 1/0011; H04L 1/0016;
(Continued)

(56) References Cited

U.S. PATENT DOCUMENTS 9,356,751 B2 * 5/2016 Wang ................... H04L 1/0003
9,806,932 B2 * 10/2017 Zhang ................. H04L 27/3488
(Continued)

FOREIGN PATENT DOCUMENTS

| CN | 103580788 A | 2/2014 |
|---|---|---|
| CN | 103634851 A | 3/2014 |

(Continued)

OTHER PUBLICATIONS

"3rd Generation Partnership Project;Technical Specification Group Radio Access Network;Evolved Universal Terrestrial Radio Access (E-UTRA);Physical layer procedures(Release 13)," 3GPP TS 36.213 V13.0.0, pp. 1-326, 3rd Generation Partnership Project, Valbonne, France (Dec. 2015).

(Continued)

*Primary Examiner* — Kashif Siddiqui
(74) *Attorney, Agent, or Firm* — Leydig, Voit & Mayer, Ltd.

(57) ABSTRACT

A network node for a wireless communication system including a processor and a transceiver are provided. The processor is configured to determine that a first channel quality indication for a first user equipment is higher than a second channel quality indication for a second user equipment, determine a first modulation and coding scheme index ($I_{MCS,N}$) for the first user equipment based on a first set of modulation and coding schemes. The first set of modulation and coding schemes includes a first range of transport block sizes [$n_0 \ldots n_1$] mapped to a first modulation order $Q_m = q_0$, and at least a second range of transport block sizes [$n_2 \ldots n_3$] mapped to a second modulation order $Q_m = q_1$, where $q_1 > q_0$, and $n_3 \geq n_1$ and $n_2 < n_1$.

14 Claims, 5 Drawing Sheets

(52) U.S. Cl.
CPC .......... *H04L 1/0011* (2013.01); *H04L 1/0016* (2013.01); *H04L 1/0026* (2013.01); *H04L 1/206* (2013.01); *H04L 5/0057* (2013.01); *H04L 27/3405* (2013.01)

(58) Field of Classification Search
CPC ... H04L 1/0026; H04L 1/206; H04L 27/3405; H04L 5/0057
See application file for complete search history.

(56) References Cited

U.S. PATENT DOCUMENTS

| | | | | |
|---|---|---|---|---|
| 10,200,827 | B2* | 2/2019 | Li | H04L 27/3488 |
| 2012/0044897 | A1* | 2/2012 | Wager | H04L 5/0037 |
| | | | | 370/329 |
| 2015/0103731 | A1* | 4/2015 | Jeon | H04B 7/0456 |
| | | | | 370/315 |
| 2015/0195818 | A1* | 7/2015 | Davydov | H04L 5/0057 |
| | | | | 370/329 |
| 2016/0165466 | A1 | 6/2016 | Kim et al. | |

FOREIGN PATENT DOCUMENTS

| | | |
|---|---|---|
| CN | 104753631 A | 7/2015 |
| CN | 105164961 A | 12/2015 |
| CN | 105491556 A | 4/2016 |

OTHER PUBLICATIONS

"Block Error Rate evaluation of Link-level simulation," 3GPP TSG RAN WG1 #82, Beijing, China, R1-154220, pp. 1-10, 3rd Generation Partnership Project, Valbonne, France (Aug. 24-28, 2015).

"Evaluation methodology for 5G non-orthogonal multiple access scheme," 3GPP TSG RAN WG1 Meeting #84bis, Busan, Korea, R1-162154, pp. 1-14, 3rd Generation Partnership Project, Valbonne, France (Apr. 11-15, 2016).

"MUST UE multiplexing and resource allocation," 3GPP TSG RAN WG1 Meeting #86b, Lisbon, Portugal, R1-1609345, pp. 1-4, 3rd Generation Partnership Project, Valbonne, France (Oct. 10-14, 2016).

"MUST UE pairing with existing CQI feedback," 3GPP TSG RAN WG1 #86bis, Lisbon, Portugal, R1-1609977, pp. 1-2, 3rd Generation Partnership Project, Valbonne, France (Oct. 10-14, 2016).

"3rd Generation Partnership Project; Technical Specification Group Radio Access Network; Evolved Universal Terrestrial Radio Access (E-UTRA); Physical layer procedures(Release 12)," 3GPP TS 36.213 V12.4.0, pp. 1-225, 3rd Generation Partnership Project, Valbonne, France (Dec. 2014).

Cover,"Elements of Information Theory," Print ISBN 0-471-06259-6 Online ISBN 0-471-20061-1, pp. 1-563, John Wiley & Sons, Inc., New York, New York (1991).

"Discussion on power ratios for MUST," 3GPP TSG RAN WG1 Meeting #85, Nanjing, China, R1-164079, pp. 1-4, 3rd Generation Partnership Project, Valbonne, France (May 23-27, 2016).

"3rd Generation Partnership Project; Technical Specification Group Radio Access Network; Study on Downlink Multiuser Superposition Transmission (MUST) for LTE; (Release 13)," 3GPP TR 36.859 V1.0.0, pp. 1-52, 3rd Generation Partnership Project, Valbonne, France (Nov. 2015).

CN/201680089775.8, Office Action, dated Mar. 4, 2020.

* cited by examiner

| MCS Index $I_{MCS}$ | Modulation Order $Q_m$ | TBS Index $I_{TBS}$ | TB size $N_{TB}$ ($N_{PRB}=5$) | TBS Index $I_{TBS}$ for new MUST TBS mapping | TB size $N_{TB}$ for new MUST TBS mapping ($N_{PRB}=5$) |
|---|---|---|---|---|---|
| 301 | 302 | 303 | 304 | 305 | 306 |
| 0 | 2 | 0 | 120 | 0 | 120 |
| 1 | 2 | 1 | 176 | 1 | 176 |
| 2 | 2 | 2 | 208 | 2 | 208 |
| 3 | 2 | 3 | 256 | 3 | 256 |
| 4 | 2 | 4 | 328 | 4 | 328 |
| 5 | 2 | 5 | 424 | 5 | 424 |
| 6 | 2 | 6 | 504 | 6 | 504 |
| 7 | 2 | 7 | 584 | 7 | 584 |
| 8 | 2 | 8 | 680 | 8 | 680 |
| 9 | 2 | 9 | 776 | 9 | 776 |
| 10 | 4 | 9 | 776 | 0 | 120 |
| 11 | 4 | 10 | 872 | 3 | 256 |
| 12 | 4 | 11 | 1000 | 6 | 504 |
| 13 | 4 | 12 | 1128 | 9 | 776 |
| 14 | 4 | 13 | 1256 | 11 | 1000 |
| 15 | 4 | 14 | 1416 | 13 | 1256 |
| 16 | 4 | 15 | 1544 | 15 | 1544 |
| 17 | 6 | 15 | 1544 | 0 | 120 |
| 18 | 6 | 16 | 1608 | 3 | 256 |
| 19 | 6 | 17 | 1800 | 6 | 504 |
| 20 | 6 | 18 | 1992 | 9 | 776 |
| 21 | 6 | 19 | 2152 | 12 | 1128 |
| 22 | 6 | 20 | 2344 | 14 | 1416 |
| 23 | 6 | 21 | 2472 | 16 | 1608 |
| 24 | 6 | 22 | 2664 | 18 | 1992 |
| 25 | 6 | 23 | 2856 | 20 | 2344 |
| 26 | 6 | 24 | 2984 | 22 | 2664 |
| 27 | 6 | 25 | 3112 | 24 | 2984 |
| 28 | 6 | 26 | 3752 | 26 | 3752 |
| 29 | 2 | reserved | | | |
| 30 | 4 | | | | |
| 31 | 6 | | | | |

MULTIUSER SUPERPOSED TRANSMISSION WITH FLEXIBLE TRANSPORT BLOCK SIZE SELECTION

CROSS-REFERENCE TO RELATED APPLICATIONS

This application is a continuation of International Application No. PCT/EP2016/073674, filed on Oct. 4, 2016, the disclosure of which is hereby incorporated by reference in its entirety.

TECHNICAL FIELD

Embodiments of the present disclosure relate generally to wireless communication systems and more particularly to multiuser superposition transmission schemes in wireless communication systems.

BACKGROUND

The basic principle of multiuser superposition transmission (MUST) schemes is superposition coding (SC). With superposition coding the total transmit power P is split between the co-scheduled user equipments (UEs). Therefore, the signal-to-noise ratio (SNR) experienced by each UE is lower than if its signal was transmitted orthogonally to other UE signals.

It has been observed that, due to the typically lower ratio of power assigned to the near UE signal, a low SNR is experienced at the near-UE receiver after successive interference cancellation (SIC). Therefore lower code rates are needed. At the same time, the far-UE SNR is similar to the SNR experienced with orthogonal transmission. Thus similar code rates as with orthogonal transmission are needed for the far UE. As code rates and transport block size (TBS) are linearly dependent, defining modulation and coding schemes (MCSs) with lower code rates for each modulation order translates into selecting smaller transport block sizes. Thus, transport block size selection for co-scheduled UEs in multiuser superposition transmission must be redefined in order to allow MUST near UEs usage of lower code rates.

In conventional LTE, the table of MCS schemes has been obtained as the result of an optimization procedure based on the SINRs experienced at the UE receiver and assuming orthogonal transmission which results in a range of increasing code rates with higher modulation orders. Using such an MCS table with MUST does not result in optimal performance as usage of low code rates with higher modulation orders is not allowed.

For example, according to one possible LTE conventional MCS to TBS mapping mode, once the MCS index ($I_{MCS}$) is determined, the TBS index ($I_{TBS}$) is determined from a conventional MCS table. The TBS ($N_{TB}$) is obtained from the TBS index ($I_{TBS}$) and from the conventional MCS table. Using low TBS index values with higher modulation orders is not allowed in conventional LTE. Therefore, new MCS to TBS mappings are needed for use with MUST.

A possible solution for the redefinition of the MCS to TBS mapping for use with MUST is to define a new TBS table of the same size as the conventional MCS table. However, such a table would be very large and it would require a huge specification effort.

Accordingly, it would be desirable to provide a redefined set of modulation and coding schemes for multiuser superposition transmission in a wireless communication system that addresses at least some of the problems identified above.

SUMMARY

It is an object of the disclosure to provide an efficient multiuser superposition transmission scheme in a cellular communication system. This object is solved by the subject matter of the independent claims. Further advantageous modifications can be found in the dependent claims.

According to a first aspect of the disclosure the above and further objects and advantages are obtained by a network node for a wireless communication system. In one embodiment, the network node includes a processor and a transceiver, where the processor is configured to determine that a first channel quality indication for a first user equipment is higher than a second channel quality indication for a second user equipment, determine a first modulation and coding scheme index ($I_{MCS,N}$) for the first user equipment based on a first set of modulation and coding schemes, wherein the first set of modulation and coding schemes includes a first range of transport block sizes [$n_0 \ldots n_1$] mapped to a first modulation order $Q_m=q_0$, and at least a second range of transport block sizes [$n_2 \ldots n_3$] mapped to a second modulation order $Q_m=q_1$, where $q_1>q_0$, and $n_3>=n_1$ and $n_2<n_1$. The aspects of the disclosed embodiments increase the throughput in systems with MUST transmission by using a flexible MCS that accounts for the MUST interference of co-scheduled UEs.

In a first possible implementation form of the network node according to the first aspect as such, the first set of modulation and coding schemes further comprises a third range of transport block sizes [$n_4 \ldots n_5$] mapped to a third modulation order $Q_m=q_2$, where $q_2>q_1$, and $n_5>=n_3$ and $n_4<n_3$. The aspects of the disclosed embodiments improve the matching of MCS to channel/interference conditions.

In a second possible implementation form of the network node according to the first aspect as such or according to the first possible implementation form a smallest transport block size $n_x$ in the range of transport block sizes [$n_x \ldots n_y$] mapped to any modulation order $Q_m>q_0$ is equal to transport block size $n_0$ in the first range of transport block sizes [$n_0 \ldots n_1$], wherein $n_0$ is mapped to the first modulation order $Q_m=q_0$. The aspects of the disclosed embodiments simplify the first MCS set while still allowing usage of low code rates with all modulation orders.

In a third possible implementation form of the network node according to the first aspect as such or according to any one of the preceding possible implementation forms the transceiver is configured to send an activation mode signal to the first user equipment. The aspects of the disclosed embodiments improve link quality by activating interference cancellation/suppression in the first UE.

In a fourth possible implementation form of the network node according to the first aspect as such or according to any one of the preceding possible implementation forms the transceiver is configured to send the first modulation and coding scheme index ($I_{MCS,N}$) to the first user equipment. The aspects of the disclosed embodiments inform the first UE about its MCS in order to allow correct reception.

In a fifth possible implementation form of the network node according to the first aspect as such or according to any one of the preceding possible implementation forms the processor is configured to determine a second modulation and coding scheme index ($I_{MCS,F}$) based on a second set of modulation and coding schemes for the second user equipment, and the transceiver is configured to send the second modulation and coding scheme index ($I_{MCS,F}$) to the second user equipment. The aspects of the disclosed embodiments inform the second UE about its MCS in order to allow correct reception.

In a sixth possible implementation form of the network node according to the first aspect as such or according to the fifth possible implementation form the transceiver is configured to transmit a superposed signal based on the first modulation and coding scheme index ($I_{MCS,N}$) and the second modulation and coding scheme index ($I_{MCS,F}$). The aspects of the disclosed embodiments increase spectral efficiency by concurrent transmission of data to all co-scheduled UEs in the same channel resources.

In a seventh possible implementation form of the network node according to the first aspect as such or according to any one of the preceding possible implementation forms a range of transport block size indices mapped to any modulation order $Q_m > q_0$ in the first set of modulation and coding schemes is [0 . . . k], and a step between two consecutive transport block size indices is a function of a maximum transport block size index value k and a number of transport block size indices for modulation order $Q_m$. The aspects of the disclosed embodiments easily derive a range of transport block sizes by a simple operation of sampling with uniform step on TBS indices.

In an eighth possible implementation form of the network node according to the first aspect as such or according to any one of the preceding possible implementation forms the range of transport block size indices mapped to any modulation order $Q_m > q_0$ in the first set of modulation and coding schemes is [0 . . . k], and a transport block size index $I_{TBS}$ is determined based on the modulation and coding scheme index $I_{MCS}$ as $I_{TBS} = \lfloor k_m(I_{MCS} - n_m) \rfloor$ where $k_m$ and $n_m$ are dependent on the modulation order $Q_m$. The aspects of the disclosed embodiments easily derive a range of transport block sizes by a simple linear transformation on the MCS index.

According to a second aspect of the disclosure the above and further objects and advantages are obtained by a first user equipment. In one embodiment, the first user equipment is configured to receive a mode activation signal, receive a first modulation and coding scheme index ($I_{MCS,N}$) based on a first set of modulation and coding schemes, wherein the first set of modulation and coding set schemes comprises a first range of transport block sizes $[n_0 \ldots n_1]$ mapped to a first modulation order $Q_m = q_0$; and at least a second range of transport block sizes $[n_2 \ldots n_3]$ mapped to a second modulation order $Q_m = q_1$, where $q_1 > q_0$, and $n_3 >= n_1$ and $n_2 < n_1$; and determine a transport block size $N_{TB,N}$ and a modulation order $Q_{m,N}$ mapped to the first modulation and coding scheme index ($I_{MCS,N}$). The aspects of the disclosed embodiments provide a receiver capable of using the first MCS set in order to perform correct decoding of superposed signal.

In a first implementation form of the first user equipment according to the second aspect as such the first user equipment is further configured to receive a superposed signal transmission based on the first modulation and coding scheme index ($I_{MCS,N}$) and a second modulation and coding scheme index ($I_{MCS,F}$) based on a second set of modulation and coding schemes, cancel or suppress an interference of a second user signal on a first user signal from the received superposed signal transmission and obtain an interference cancelled signal and decode the interference cancelled signal based on the determined transport block size $N_{TB,N}$ and modulation order $Q_{m,N}$. The aspects of the disclosed embodiments provide a receiver which is capable of interference cancellation/suppression and correct decoding of the received superposed signal using the information in the first MCS set.

According to a third aspect of the disclosure the above and further objects and advantages are obtained by a second user equipment. In one embodiment the second user equipment is configured to receive a second modulation and coding scheme index ($I_{MCS,F}$) based on a second set of modulation and coding schemes, determine a transport block size $N_{TB,F}$ and a modulation order $Q_{m,F}$ mapped to the second modulation and coding scheme index ($I_{MCS,F}$), receive a superposed signal transmission based on a first modulation and coding scheme index ($I_{MCS,N}$) and the second modulation and coding scheme index ($I_{MCS,F}$); and decode the received superposed signal based on the determined transport block size $N_{TB,F}$ and modulation order $Q_{m,F}$. The aspects of the disclosed embodiments provide a second receiver that performs correct decoding of the received superposed signal using the information in the second MCS set, thus further increasing the system throughput.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
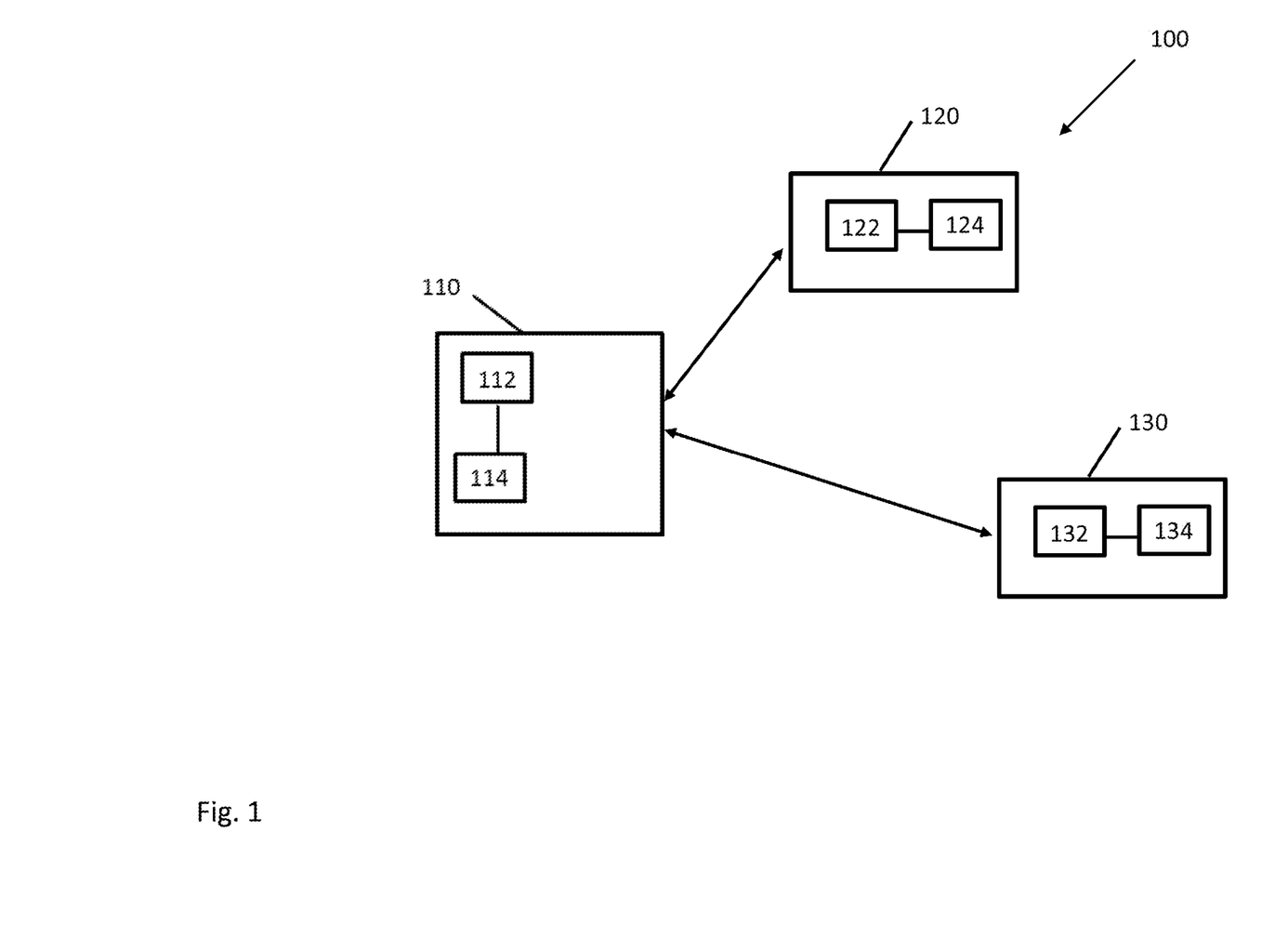
FIG. 1 is a block diagram illustrating an exemplary communication system incorporating aspects of the disclosed embodiments.

Referring to FIG. 1 there can be seen an exemplary block diagram of a communication system 100 incorporating aspects of the disclosed embodiments. The aspects of the disclosed embodiments are directed to a modulation and coding scheme (MCS) to transport block size (TBS) mapping in a multiuser superposition transmission (MUST) scheme to achieve usage of lower code rates with higher order modulations.

As is illustrated in FIG. 1, the wireless communication system 100 includes at least one network node 110, at least one first user equipment or node 120 and at least one second user equipment or node 130. The wireless communication system 100 can be any suitable type of wireless communication system, such as for example, but not limited to LTE, 5G or new radio (NR). In one embodiment, the network node 110 can comprise or include a network node such as an Evolved Universal Terrestrial Radio Access Network (E-UTRAN) NodeB or evolved NodeB (eNB). The first user node 120 and second user node 130 can comprise or include one or more user equipment (UE) or communication apparatus such as a mobile communication device, for example.

In the example of FIG. 1, the network node 110 is configured to include at least one processor or processing device 112 and at least one transceiver device 114. While the processor 112 and transceiver 114 are shown in FIG. 1 as being separate devices, in alternate embodiments, the processor 112 and transceiver device 114 can comprise a single unit or device. The network node 110 can include any suitable number of processors 112 and transceivers 114, depending upon the particular application and implementation.

The first user node 120 will generally be configured to include at least one transceiver 122 and at least one processor or processing device 124. Although the transceiver 122 and processor 124 are shown in the example of FIG. 1 as separate devices, in alternate embodiments, the transceiver 122 and processor 124 can comprise a single unit or device, as will be generally understood. The first user node 120 can be configured to include any suitable number of transceivers 122 and processors 124, depending upon the particular application and implementation.

Similarly, the second user node 130 will generally be configured to include at least one transceiver 132 and at least one processor or processing device 134. Although the transceiver 132 and processor 134 are shown in the example of FIG. 1 as separate devices, in alternate embodiments, the transceiver 132 and processor 134 can comprise a single unit or device, as will be generally understood. The second user node 130 can be configured to include any suitable number of transceivers 132 and processors 134, depending upon the particular application and implementation.

Figure 2:
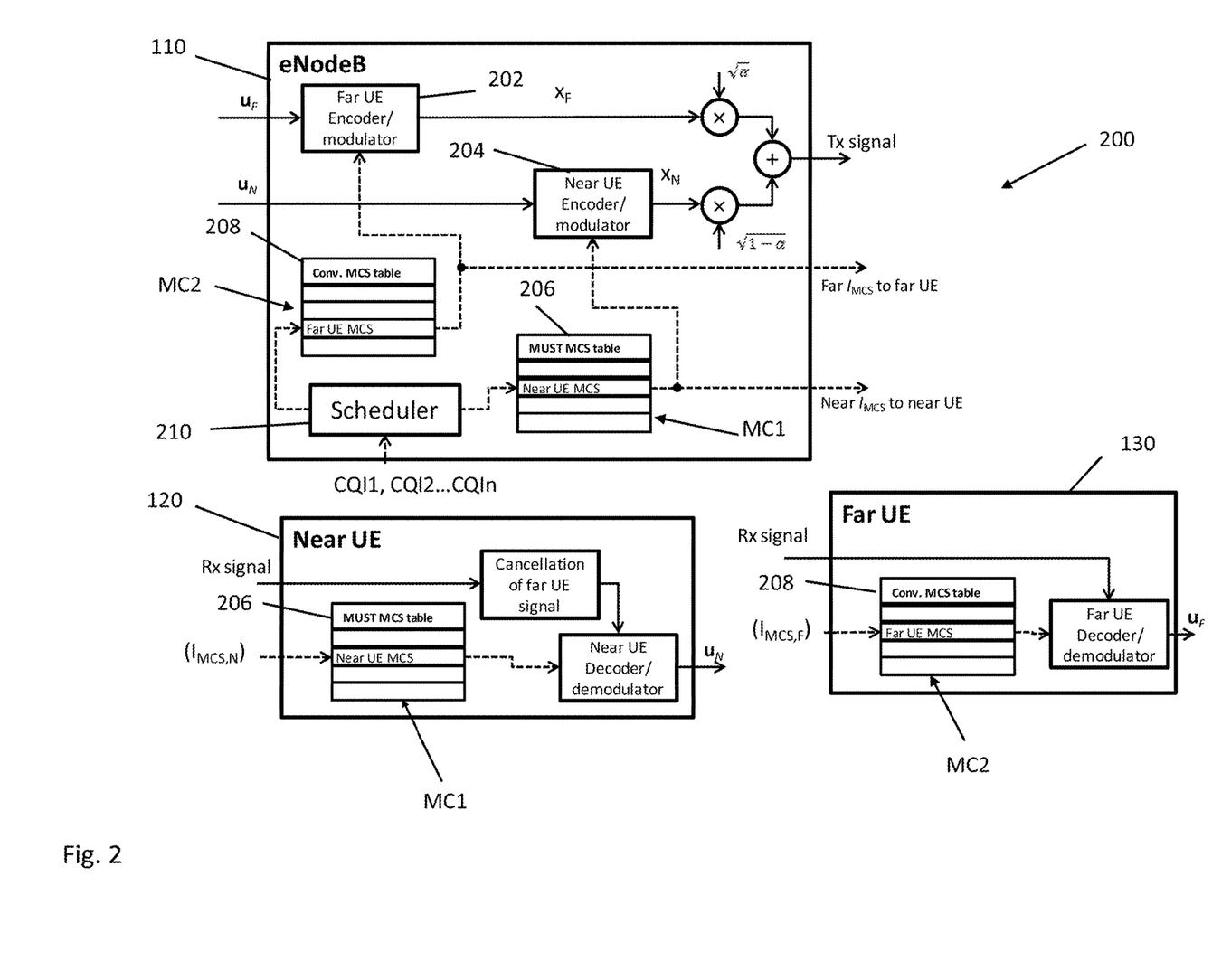
FIG. 2 illustrates a schematic block diagram of an exemplary communication system incorporating aspects of the disclosed embodiments.

The aspects of the disclosed embodiments are directed to MCS-to-TBS mapping for multiuser superposition transmission in order to allow usage of lower code rates with higher order modulations. FIG. 2 illustrates a schematic block diagram of an exemplary communication system 200 incorporating aspects of the disclosed embodiments. In this example, the network node 110 can be referred to as the eNodeB. For the ease of the description herein, the first user equipment 120 can also be referred to as the "Near UE" and the second user equipment 130 can be referred to as the "Far UE".

In one embodiment, the network node 110 in the example of FIG. 2 can include a Far UE encoder/modulator 202 and a Near UE encoder/modulator 204. As shown in FIG. 2, the far UE message $u_F$ and near UE message $u_N$ and are independently encoded and modulated by the respective encoder/modulators 202, 204 to obtain signals $x_N$ and $x_F$, which are then scaled and superposed, as will be generally understood. A ratio $\alpha$ of the total transmit power P is assigned to the far UE 130. After superposition, the signal Tx is transmitted.

The scheduler 210 in FIG. 2 is a processing unit that is configured to receive channel quality indications (CQIs) from each UE in the cell, such as the first or near user equipment 120 and the second or far user equipment 130. The scheduler 210 is configured to select the UEs 120, 130 for transmission in next transmission time interval (TTI) and compute the MCS index for each of the co-scheduled UEs 120, 130.

Referring to FIGS. 1 and 2, in one embodiment, the processor 114 of the network node 110, which can include the scheduler 210, is configured to determine that a first channel quality indication CQI1 for the first user equipment 120 is higher than a second channel quality indication CQI2 for the second user equipment 130. The processor 114 is configured to determine a first modulation and coding scheme index ($I_{MCS,N}$) for the first user equipment 120 based on a first set of modulation and coding schemes MC1 from the MUST MCS Table 206 shown in FIG. 2. The term "table" as it is used herein, generally refers to data or data elements that are stored in a memory or other data storage device.

Figure 3:
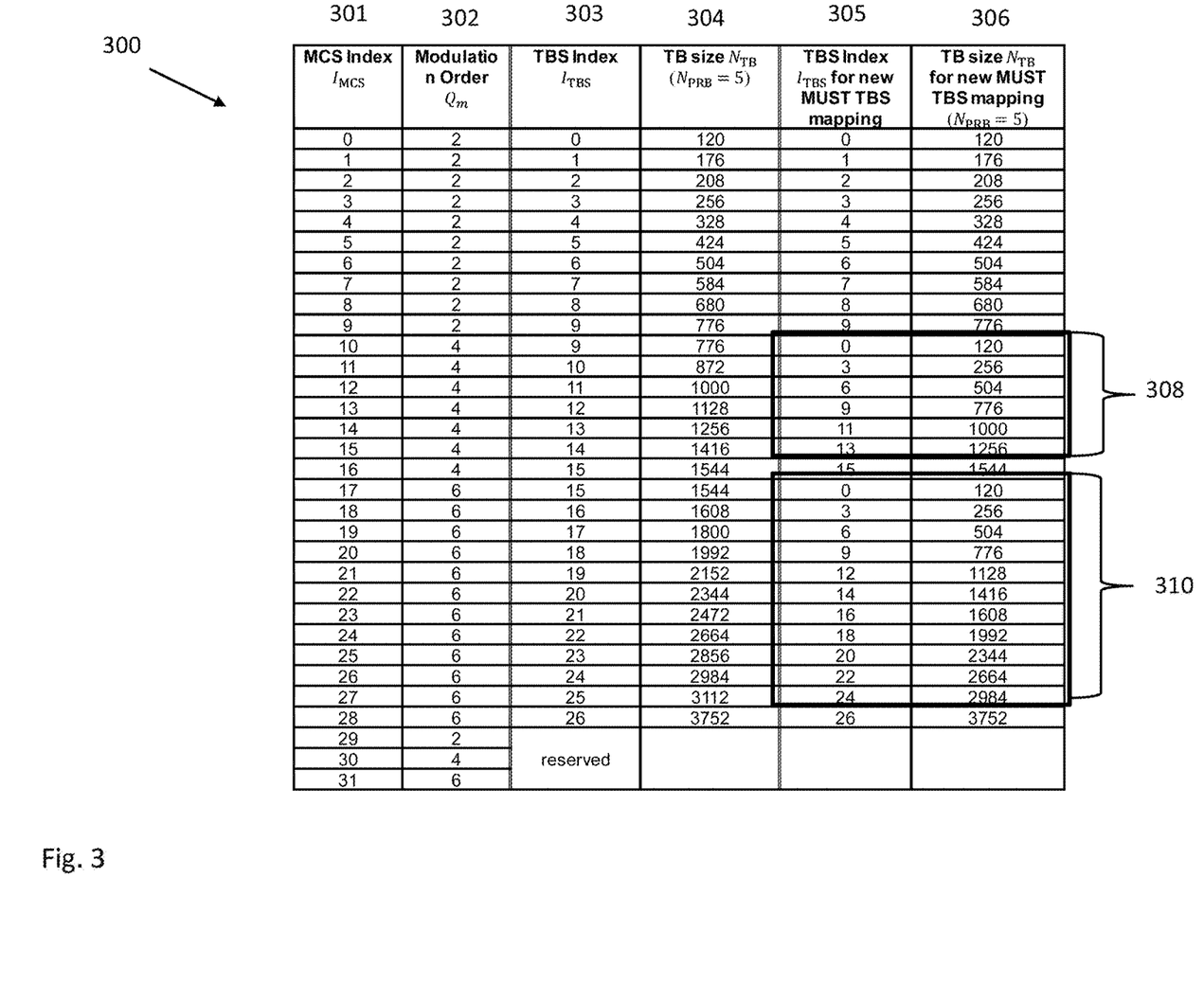
FIG. 3 illustrates an exemplary modulation and coding scheme table for use in a system incorporating aspects of the disclosed embodiments.

Referring also to the Table 300 in FIG. 3, in one embodiment, the first set of modulation and coding schemes MC1 comprises a first range of transport block sizes $[n_0 \ldots n_1]$ mapped to a first modulation order $Q_m=q_0$, and at least a second range of transport block sizes $[n_2 \ldots n_3]$ mapped to a second modulation order $Q_m=q_1$, where $q_1>q_0$, and $n_3>=n_1$ and $n_2<n_1$. In one embodiment, the first set of modulation and coding schemes (MC1) further comprises a third range of transport block sizes $[n_4 \ldots n_5]$ mapped to a third modulation order $Q_m=q_2$, where $q_2>q_1$, and $n_5>=n_3$ and $n_4<n_3$. A smallest transport block size $n_x$ in the range of transport block sizes $[n_x \ldots n_y]$ mapped to any modulation order $Q_m>q_0$ may be equal to transport block size $n_0$ in the first range of transport block sizes $[n_0 \ldots n_1]$, wherein $n_0$ is mapped to the first modulation order $Q_m=q_0$.

The Table 300 in FIG. 3 illustrates the new MUST MCS-to-TBS mapping corresponding to the first set of modulation and coding schemes MC1 of Table 206 of FIG. 2 in accordance with the aspects of the disclosed embodiments. Table 300 also illustrates the conventional MCS-to-TBS mapping corresponding to the second set of modulation and coding schemes MC2 of Table 208 in FIG. 2.

In Table 300, the first column 301 represents the MCS Index $I_{MCS}$. The second column 302 represents the modulation order $Q_m$. The third column 303 is the TBS Index $I_{TBS}$. The fourth column 304 is the TB size $N_{TB}$. In this example, the number of resource block (RB) pairs, $N_{PRB}$, is five. The first 301, third 303 and fourth 304 columns of the Table 300 show the LTE conventional MCS to TBS mapping.

The fifth 305 and sixth 306 column of the Table 300 in FIG. 3 show the new MUST mapping of $I_{MCS}$ to $I_{TBS}$ in accordance with the aspects of the disclosed embodiments. The fifth column 305 represents the TBS Index $I_{TBS}$ for the new MUST MCS to TBS mapping of the disclosed embodiments. The sixth column 306 represents the TB size $N_{TB}$ for the new MUST MCS to TBS mapping of the disclosed embodiments. In this example, the number of resource block pairs, $N_{PRB}$ in the sixth column 306 is five.

The MUST MCS-to-TBS mapping modifications in accordance with the disclosed embodiments are shown in the blocks 308 and 310 of cells of the fifth column 305 and sixth column 306. The cells in the blocks 308 and 310 corresponding to the range of MCS index values $I_{MCS}=[10\text{-}15]$ and $I_{MCS}=[17\text{-}27]$ of the first column 301.

The new MUST MCS-to-TBS mapping of the disclosed embodiments has been designed according to the following basic criterion. For each modulation order $Q_m$, the corresponding TBS indices are obtained by sampling almost uniformly the TBS index values between 0 and the maximum conventional TBS index for the given modulation order.

For example, in the conventional MCS to TBS mapping, referring for example to the third column of Table 300, the TBS indices for 16QAM ($Q_m$=4) take values in the range $I_{TBS}$=[9, . . . ,15]. In the new MUST MCS to TBS mapping table 206, referring to the fifth column 305 of Table 300, this range is extended as $I_{TBS}$=[0, . . . , 15]. In the fifth column 305 of Table 300, the minimum TBS index value is $I_{TBS}$=0 and the maximum TBS index value $I_{TBS}$ is the same as in the conventional table 208: $I_{TBS,MAX}^{16QAM}$=15.

For the modulation order $Q_m$=4 corresponding to 16QAM, there are $N_{16QAM}$=7 entries in column 301 of Table 300. In order to be able to cover the whole range of TBS indices from 0 to $I_{TBS,MAX}^{16QAM}$, the TBS indices in the new table 206 cannot be consecutive. Therefore, the new indices are determined by sampling the range of integers [0, 15] almost uniformly. For example, in one embodiment, the step between two consecutive TBS indices $I_{TBS}$ in column 305 of Table 300 is either $\lfloor I_{TBS,MAX}^{16QAM}/N_{16QAM} \rfloor = \lfloor 15/7 \rfloor = 2$ or $\lceil I_{TBS,MAX}^{16QAM}/N_{16QAM} \rceil = \lceil 15/7 \rceil = 3$.

In the conventional MCS to TBS mapping table 208, referring also to the third column 303 of Table 300, the TBS indices for 64QAM ($Q_m$=6) take values in the range $I_{TBS}$=[15, . . . , 26]. In the new MUST MCS table 206 of the disclosed embodiments, referring to the fifth column 305 of Table 300, this range is extended as $I_{TBS}$=[0, . . . ,26]. As illustrated in the fifth column of Table 300, the minimum TBS index value is $I_{TBS}$=0 and the maximum TBS index is the same as in the conventional table: $I_{TBS,MAX}^{64QAM}$=26. For the modulation order $Q_m$=6 in Table 300, there are $N_{64QAM}$=12 entries corresponding to 64QAM. In order to be able to cover the whole range of TBS indices $I_{TBS}$ from 0 to $I_{TBS,MAX}^{64QAM}$, in one embodiment the new indices $I_{TBS}$ in column 305 of Table 300 are determined by sampling the range of integers [0, 26] almost uniformly with a step between two consecutive TBS indices being either $\lfloor I_{TBS,MAX}/N_{64QAM} \rfloor = \lfloor 26/12 \rfloor = 2$ or $\lceil I_{TBS,MAX}/N_{64QAM} \rceil = \lceil 26/12 \rceil = 3$.

As the new MUST MCS-to-TBS mapping shown in Table 3 has been designed for the first or near-UE 120 in these example, in each transmission time interval with MUST transmission, each co-scheduled UE should use (1) the LTE conventional MCS-to-TBS mapping of Table MC1 when the UE is paired as a MUST-far UE 130, or when it is not paired with other UEs; and (2) the new MUST MCS-to-TBS mapping of Table MC2 when the UE is paired as a MUST-near UE 120. The MUST-capable UEs 120, 130 of the disclosed embodiments are configured to dynamically switch between the conventional MCS-to-TBS mapping of Table 208 and the new MUST MCS-to-TBS mapping of Table 206 in each transmission time interval.

In one embodiment, the TBS is determined by setting the TBS index ($I_{TBS}$) equal to:

$I_{TBS} = \lfloor k_0(I_{MCS} - n_0) \rfloor$ when $I_{MCS}$ corresponds to modulation order $Q_m$=2, $I_{TBS} = \lfloor k_1(I_{MCS} - n_1) \rfloor$ when $I_{MCS}$ corresponds to modulation order $Q_m$=4, $I_{TBS} = \lfloor k_2(I_{MCS} - n_2) \rfloor$ when $I_{MCS}$ corresponds to modulation order $Q_m$=6.

As an example, the following convenient choice for parameters $k_1$, $k_2$, $n_1$ and $n_2$ are provided:

$k_0$=1; $k_1$=$k_2$=2;

$n_0$=0; $b_1$=8; $n_2$=13.

As $k_1$=$k_2$=2, each unitary increment of $I_{MCS}$ causes a double-unit increment of $I_{TBS}$, therefore the TBS range—and the corresponding code rates—is extended. Moreover, it is easy to verify that the example values of $n_1$, $k_1$ and $n_2$, $k_2$ are such that, for each given modulation order, the largest TBS in the new MUST MCS-to-TBS mapping of Table 206 is the same as in the LTE conventional TBS mapping of Table 208. This is beneficial as the near-UE $SINR_N$ is similar to the SNR of orthogonal transmission $SNR_N^{(OT)}$ when the far-UE power ratio is low.

The determination referred to above provides the main advantage that it does not require to specify a new MCS index to TBS index table. Therefore, fewer specification changes are needed.

Figure 4:
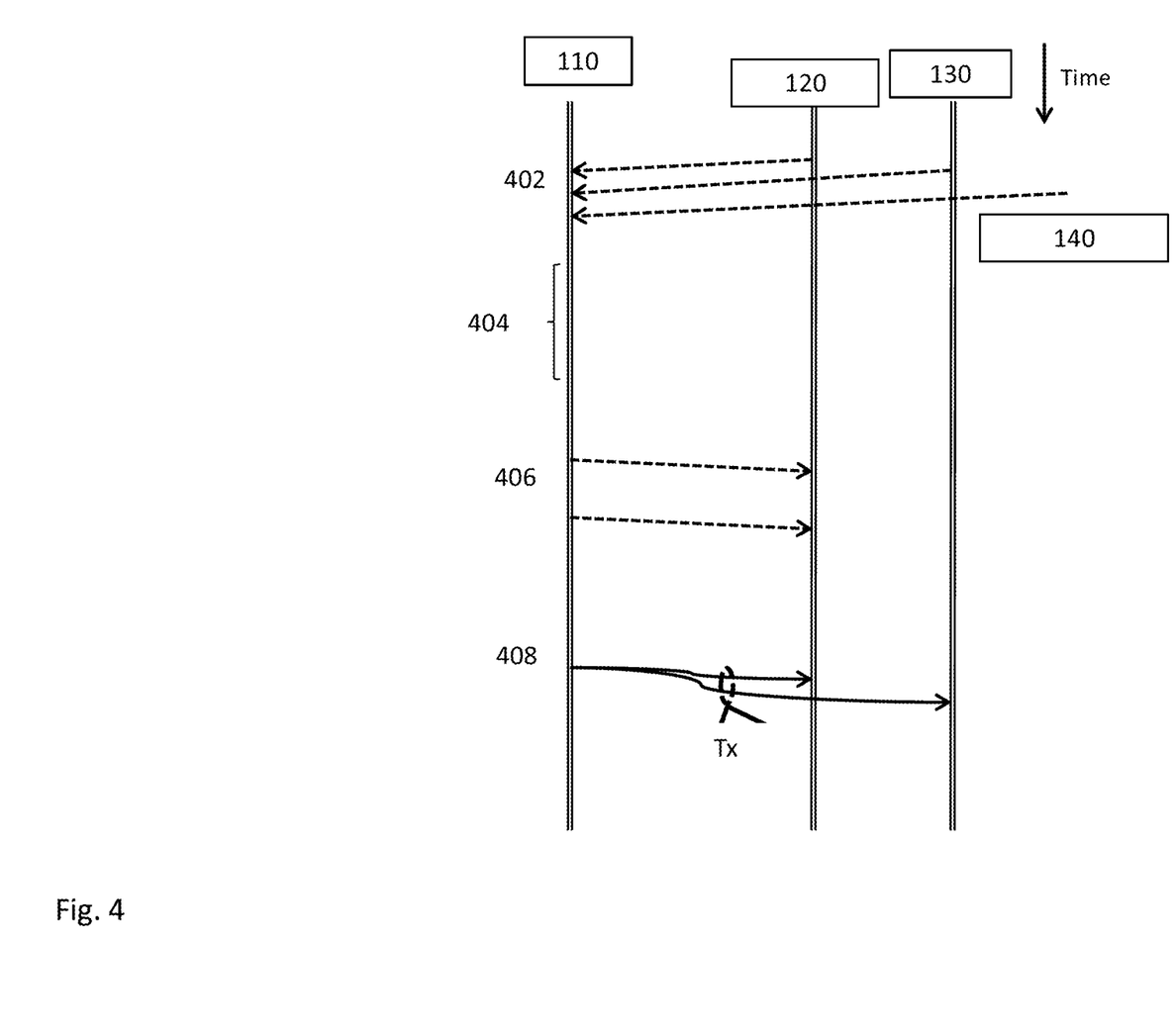
FIG. 4 illustrates a schematic diagram of an exemplary signaling process flow in a system incorporating aspects of the disclosed embodiments.

FIG. 4 illustrates an exemplary signaling scheme between the network node 110 or eNodeB, the first or near UE 120 and the second or far UE 130 in a cell with MUST transmission using the new MCS-to-TBS mapping table 206 for the near UE 120. In a first step 402, the network node 110 receives communication quality indicators (CQIs) from all the UEs in the cell, which in this example are shown as the first UE 120, the second UE 130 as well as other UEs 140.

Based on the received CQIs, the network node 110 schedules 404 the first UE 120 paired with the second UE 130, and computes the first modulation and coding scheme index $I_{MCS,N}$ based on the first set of modulation and coding schemes MC1 of table 206. The network node 110 is also configured to compute the second modulation and coding scheme index $I_{MCS,F}$ based on the second set of modulation and coding schemes MC2 of the second, or conventional table 208. In one embodiment, the network node 110 signals 406 activation of the near UE mode to the first UE 120. The network node 110 also transmits the first modulation and coding scheme index $I_{MCS,N}$ to the first UE 120. In one embodiment, the transceiver 114 of FIG. 1 can be configured to transmit or send the activation mode signal to the first UE 120 as well as the first modulation and coding scheme index $I_{MCS,N}$. The transceiver 114 can also be configured to send the second modulation and coding scheme index $I_{MCS,F}$ to the second UE 130.

In one embodiment, the network node 110 is configured to perform 408 superposed transmission to both the first UE 120 and the second UE 130 simultaneously. Generally, the transceiver 114 is configured to transmit a superposed signal Tx based on the first modulation and coding scheme index $I_{MCS,N}$ and the second modulation and coding scheme index $I_{MCS,F}$ to both the first UE 120 and the second UE 130. Generally, the first UE 120 demodulates and decodes the far-UE signal from the superposed signal Tx treating its own signal as noise, and then cancels the interfering far-UE signal from the received signal such that the resulting signal-to-interference plus noise ratio (SINR) after cancellation is increased.

Figure 5:
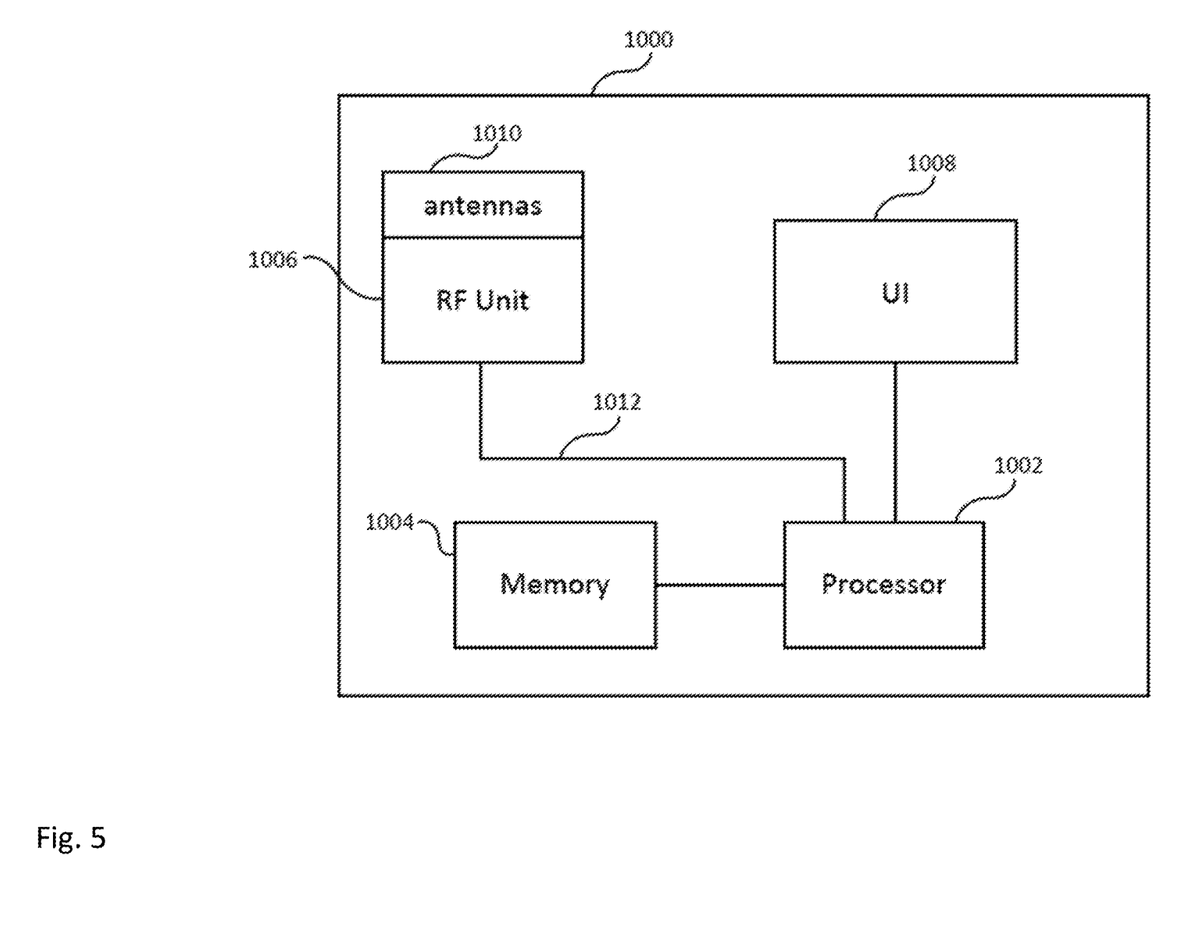
FIG. 5 is a block diagram of an exemplary computing architecture that can be used to implement aspects of the disclosed embodiments.

FIG. 5 illustrates a block diagram of an exemplary apparatus 1000 appropriate for implementing aspects of the disclosed embodiments. The apparatus 1000 is appropriate for use in a wireless network and can be implemented in one or more of the network node 110, the user equipment 120 and the third user equipment 130. The network node 110 can comprise or include an Evolved Universal Terrestrial Radio Access Network (E-UTRAN) NodeB or evolved NodeB (eNB). The UEs 120 and 130 can comprise or include various types of mobile computing devices, including various types of wireless communications user equipment such as cell phones, smart phones, tablet devices, and wirelessly connected automobiles. Alternatively the apparatus 1000 may be configured in or as an access node or base station in a wireless communication network.

The apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the apparatus 1000. When the UI 1008 is removed the apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112, 122 and 132 described with respect to FIG. 1, may be configured to implement any of the methods described herein.

In the example of FIG. 5, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein. As noted herein, the tables 206 and 208, and the data contained therein, are configured to be stored in one or more memory devices, such as memory 1004. Each of the network node 110, UE 120 and UE 130 are configured to include or be coupled to a respective memory 1004.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The apparatus 1000 can also include or be coupled to an RF Unit 1006 such as a transceiver, coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

The aspects of the disclosed embodiments generally results in increased down-link throughput for the wireless communication system and are applicable to all coded modulation transmission systems sending information to multiple co-scheduled users with MUST, possibly combined with OFDM and MIMO transmission. The aspects of the disclosed embodiments provide at least the following advantages. There is no requirement to specify additional modulation and coding schemes for MUST. There is also no need for any additional control information for MCS signaling to MUST UEs. There is maximum flexibility in MCS index to TBS index mapping, provided that the TBSs already available in the specification are used. It is not necessary to define a new TBS table. Rather, only one new column, column 305 in Table 3, in the MCS index to TBS index table is added for MUST.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the presently disclosed disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A network node for a wireless communication system, the network node including a processor and a transceiver, the processor being configured to:
   determine that a first channel quality indication (CQI1) for a first user equipment is higher than a second channel quality indication (CQI2) for a second user equipment;
   determine a first modulation and coding scheme index ($I_{MCS,N}$) for the first user equipment based on a first set of modulation and coding schemes (MC1), wherein the first set of modulation and coding schemes (MC1) comprises:
      a first range of transport block sizes [$n_0 \ldots n_1$] mapped to a first modulation order $Q_m = q_0$; and
      at least a second range of transport block sizes [$n_2 \ldots n_3$] mapped to a second modulation order $Q_m = q_1$, where $q_1 > q_0$, and $n_3 >= n_1$ and $n_2 < n_1$.

2. The network node according to claim 1, wherein the first set of modulation and coding schemes (MC1) further comprises a third range of transport block sizes [$n_4 \ldots n_5$] mapped to a third modulation order $Q_m = q_2$, where $q_2 > q_1$, and $n_5 >= n_3$ and $n_4 < n_3$.

3. The network node according to claim 1, wherein a smallest transport block size $n_x$ in the range of transport block sizes $[n_x \ldots n_y]$ mapped to any modulation order $Q_m > q_0$ is equal to transport block size $n_0$ in the first range of transport block sizes $[n_0 \ldots n_1]$, wherein $n_0$ is mapped to the first modulation order $Q_m = q_0$.

4. The network node according to claim 1, wherein the transceiver is configured to send an activation mode signal to the first user equipment.

5. The network node according to claim 1, wherein the transceiver is configured to send the first modulation and coding scheme index ($I_{MCS,N}$) to the first user equipment.

6. The network node according to claim 1, wherein the processor is configured to determine a second modulation and coding scheme index ($I_{MCS,F}$) based on a second set of modulation and coding schemes (MC2) for the second user equipment, and the transceiver is configured to send the second modulation and coding scheme index ($I_{MCS,F}$) to the second user equipment.

7. The network node according to claim 6 wherein the transceiver is configured to transmit a superposed signal based on the first modulation and coding scheme index ($I_{MCS,N}$) and the second modulation and coding scheme index ($I_{MCS,F}$).

8. The network node according to claim 1, wherein a range of transport block size indices mapped to any modulation order $Q_m > q_0$ in the first set of modulation and coding schemes (MC1) is $[0 \ldots k]$, and a step between two consecutive transport block size indices is a function of a maximum transport block size index value k and a number of transport block size indices for modulation order $Q_m$.

9. The network node according to claim 1, wherein the range of transport block size indices mapped to any modulation order $Q_m > q_0$ in the first set of modulation and coding schemes (MC1) is $[0 \ldots k]$, and a transport block size index $I_{TBS}$ is determined based on a modulation and coding scheme index $I_{MCS}$ as $I_{TBS} = \lfloor k_m (I_{MCS} - n_m) \rfloor$, where $k_m$ and $n_m$ are dependent on a modulation order $Q_m$.

10. A first user equipment comprising:
a processor; and
a memory coupled to the processor and having processor-executable instructions stored thereon, which when executed by the processor, cause the first user equipment to:
receive an activation mode signal;
receive a first modulation and coding scheme index ($I_{MCS,N}$) based on a first set of modulation and coding schemes (MC1), wherein the first set of modulation and coding set schemes (MC1) comprises:
a first range of transport block sizes $[n_0 \ldots n_1]$ mapped to a first modulation order $Q_m = q_0$; and
at least a second range of transport block sizes $[n_2 \ldots n_3]$ mapped to a second modulation order $Q_m = q_1$, where $q_1 > q_0$, and $n_3 >= n_1$ and $n_2 < n_1$; and
determine a transport block size $N_{TB,N}$ and a modulation order $Q_{m,N}$ mapped to the first modulation and coding scheme index ($I_{MCS,N}$).

11. The first user equipment according to claim 10, wherein the processor-executable instructions further cause the first user equipment to:
receive a superposed signal transmission based on the first modulation and coding scheme index ($I_{MCS,N}$) and a second modulation and coding scheme index ($I_{MCS,F}$) based on a second set of modulation and coding schemes (MC2);
cancel or suppress an interference of a second user signal on a first user signal from the received superposed signal transmission and obtain an interference cancelled signal; and
decode the interference cancelled signal based on the determined transport block size $N_{TB,N}$ and the determined modulation order $Q_{m,N}$.

12. The first user equipment according to claim 11, wherein the first set of modulation and coding schemes (MC1) further comprises a third range of transport block sizes $[n_4 \ldots n_5]$ mapped to a third modulation order $Q_m = q_2$, where $q_2 > q_1$, and $n_5 >= n_3$ and $n_4 < n_3$.

13. The first user equipment according to claim 11, wherein a smallest transport block size $n_x$ in the range of transport block sizes $[n_x \ldots n_y]$ mapped to any modulation order $Q_m > q_0$ is equal to transport block size $n_0$ in the first range of transport block sizes $[n_0 \ldots n_1]$, wherein $n_0$ is mapped to the first modulation order $Q_m = q_0$.

14. The first user equipment according to claim 11, wherein the processor-executable instructions further cause the first user equipment to:
receive an activation mode signal form a network node.

* * * * *